US007797163B2

(12) United States Patent
Pang et al.

(10) Patent No.: US 7,797,163 B2
(45) Date of Patent: Sep. 14, 2010

(54) APPARATUS FOR PROCESSING MEDIA SIGNAL AND METHOD THEREOF

(75) Inventors: Hee Suk Pang, Seoul (KR); Dong Soo Kim, Seoul (KR); Jae Hyun Lim, Seoul (KR); Hyen O Oh, Gyeonggi-do (KR); Yang-Won Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 145 days.

(21) Appl. No.: 12/296,098

(22) PCT Filed: Apr. 2, 2007

(86) PCT No.: PCT/KR2007/001602

§ 371 (c)(1), (2), (4) Date: Oct. 3, 2008

(87) PCT Pub. No.: WO2007/114624

PCT Pub. Date: Oct. 11, 2007

(65) Prior Publication Data

US 2009/0287494 A1 Nov. 19, 2009

Related U.S. Application Data

(60) Provisional application No. 60/832,390, filed on Jul. 21, 2006, provisional application No. 60/791,432, filed on Apr. 13, 2006, provisional application No. 60/789,874, filed on Apr. 7, 2006, provisional application No. 60/788,092, filed on Apr. 3, 2006.

(30) Foreign Application Priority Data

Aug. 18, 2006 (KR) ...................... 10-2006-0078300

(51) Int. Cl.
*G10L 19/00* (2006.01)
*G10L 21/00* (2006.01)
*H04R 5/00* (2006.01)
*H04B 1/00* (2006.01)

(52) U.S. Cl. ......................... 704/500; 704/201; 381/22; 381/23; 381/119

(58) Field of Classification Search ....................... None
See application file for complete search history.

(56) References Cited

U.S. PATENT DOCUMENTS 5,166,685 A 11/1992 Campbell et al.

(Continued)

FOREIGN PATENT DOCUMENTS

EP 1455345 9/2004

(Continued)

OTHER PUBLICATIONS

Breebaart, et al.: "Multi-Channel Goes Mobile: MPEG Surround Binaural Rendering" In: Audio Engineering Society the 29th International Conference, Seoul, Sep. 2-4, 2006, pp. 1-13. See the abstract, pp. 1-4, figures 5,6.

(Continued)

*Primary Examiner*—Matthew J Sked
(74) *Attorney, Agent, or Firm*—Fish & Richardson P.C.

(57) ABSTRACT

The present invention relates to a method of processing a media signal and apparatus therefor. A media signal decoding method according to the present invention includes detecting a channel having a valid value of the multi-channels to be generated and generating the detected channel having the valid value from the downmix signal and the spatial information signal. Accordingly, the present invention is able to reduce a decoding operation quantity by detecting which one of the channels to be generated from a transferred media signal is set to a virtual value and omitting decoding for the generation of the channel set to the virtual value.

13 Claims, 5 Drawing Sheets

U.S. PATENT DOCUMENTS

| | | | |
|---|---|---|---|
| 5,524,054 | A | 6/1996 | Spille et al. |
| 5,579,396 | A | 11/1996 | Iida et al. |
| 5,632,005 | A | 5/1997 | Morris et al. |
| 5,703,584 | A | 12/1997 | Hill et al. |
| 6,118,875 | A | 9/2000 | Moller |
| 6,307,941 | B1 | 10/2001 | Tanner et al. |
| 6,574,339 | B1 | 6/2003 | Kim |
| 6,711,266 | B1 | 3/2004 | Aylward et al. |
| 6,973,130 | B1 | 12/2005 | Wee et al. |
| 7,555,434 | B2 | 6/2009 | Nomura et al. |
| 2003/0236583 | A1 | 12/2003 | Baumgarte et al. |
| 2004/0071445 | A1 | 4/2004 | Tarnoff et al. |
| 2004/0196770 | A1 | 10/2004 | Touyama et al. |
| 2005/0074127 | A1 | 4/2005 | Herre et al. |
| 2005/0180579 | A1 | 8/2005 | Baumgarte |
| 2005/0195981 | A1 | 9/2005 | Faller et al. |
| 2006/0004583 | A1* | 1/2006 | Herre et al. ................. 704/500 |
| 2006/0115100 | A1 | 6/2006 | Faller et al. |
| 2006/0133618 | A1 | 6/2006 | Villemoes et al. |
| 2006/0153408 | A1 | 7/2006 | Faller et al. |
| 2007/0172071 | A1* | 7/2007 | Mehrotra et al. .............. 381/23 |
| 2008/0002842 | A1* | 1/2008 | Neusinger et al. ........... 381/119 |

FOREIGN PATENT DOCUMENTS

| | | |
|---|---|---|
| JP | 09-275544 | 10/1997 |
| JP | 2001-188578 | 7/2001 |
| JP | 08-065169 | 3/2008 |
| JP | 08-202397 | 9/2008 |
| KR | 10-2001-0001993 | 1/2001 |
| KR | 10-2001-0009258 | 2/2001 |
| RU | 2119259 | 9/1998 |
| RU | 2129336 | 4/1999 |
| TW | 289885 | 11/1996 |
| TW | 550541 | 9/2003 |
| TW | 200304120 | 9/2003 |
| TW | 200405673 | 4/2004 |
| TW | 594675 | 6/2004 |
| WO | 9949574 | 9/1999 |
| WO | WO 03/070656 | 1/2003 |
| WO | 03-090208 | 10/2003 |
| WO | 2004-008805 | 1/2004 |
| WO | 2004-019656 | 3/2004 |
| WO | 2004-036549 | 4/2004 |
| WO | 2004-036954 | 4/2004 |
| WO | 2004-036955 | 4/2004 |
| WO | 2004036548 | 4/2004 |

OTHER PUBLICATIONS

Breebaart, J., et al.: "MPEG Spatial Audio Coding/MPEG Surround: Overview and Current Status" In: Audio Engineering Society the 119th Convention, New York, Oct. 7-10, 2005, pp. 1-17. See pp. 4-6.

Faller, C., et al.: "Binaural Cue Coding—Part II: Schemes and Applications", IEEE Transactions on Speech and Audio Processing, vol. 11, No. 6, 2003, 12 pages.

Faller, C.: "Coding of Spatial Audio Compatible with Different Playback Formats", Audio Engineering Society Convention Paper, Presented at 117th Convention, Oct. 28-31, 2004, San Francisco, CA.

Faller, C.: "Parametric Coding of Spatial Audio", Proc. of the 7th Int. Conference on Digital Audio Effects, Naples, Italy, 2004, 6 pages.

Herre, J., et al.: "Spatial Audio Coding: Next generation efficient and compatible coding of multi-channel audio", Audio Engineering Society Convention Paper, San Francisco, CA , 2004, 13 pages.

Herre, J., et al.: "The Reference Model Architecture for MPEG Spatial Audio Coding", Audio Engineering Society Convention Paper 6447, 2005, Barcelona, Spain, 13 pages.

International Search Report in International Application No. PCT/KR2006/000345, dated Apr. 19, 2007, 1 page.

International Search Report in International Application No. PCT/KR2006/000346, dated Apr. 18, 2007, 1 page.

International Search Report in International Application No. PCT/KR2006/000347, dated Apr. 17, 2007, 1 page.

International Search Report in International Application No. PCT/KR2006/000866, dated Apr. 30, 2007, 1 page.

International Search Report in International Application No. PCT/KR2006/000867, dated Apr. 30, 2007, 1 page.

International Search Report in International Application No. PCT/KR2006/000868, dated Apr. 30, 2007, 1 page.

International Search Report in International Application No. PCT/KR2006/001987, dated Nov. 24, 2006, 2 pages.

International Search Report in International Application No. PCT/KR2006/002016, dated Oct. 16, 2006, 2 pages.

International Search Report in International Application No. PCT/KR2006/003659, dated Jan. 9, 2007, 1 page.

International Search Report in International Application No. PCT/KR2006/003661, dated Jan. 11, 2007, 1 page.

International Search Report in International Application No. PCT/KR2007/000340, dated May 4, 2007, 1 page.

International Search Report in International Application No. PCT/KR2007/000668, dated Jun. 11, 2007, 2 pages.

International Search Report in International Application No. PCT/KR2007/000672, dated Jun. 11, 2007, 1 page.

International Search Report in International Application No. PCT/KR2007/000675, dated Jun. 8, 2007, 1 page.

International Search Report in International Application No. PCT/KR2007/000676, dated Jun. 8, 2007, 1 page.

International Search Report in International Application No. PCT/KR2007/000730, dated Jun. 12, 2007, 1 page.

International Search Report in International Application No. PCT/KR2007/001560, dated Jul. 20, 2007, 1 page.

International Search Report in International Application No. PCT/KR2007/001602, dated Jul. 23, 2007, 1 page.

Scheirer, E. D., et al.: "AudioBIFS: Describing Audio Scenes with the MPEG-4 Multimedia Standard", IEEE Transactions on Multimedia, Sep. 1999, vol. 1, No. 3, pp. 237-250. See the abstract.

Vannanen, R., et al.: "Encoding and Rendering of Perceptual Sound Scenes in the Carrouso Project", AES 22nd International Conference on Virtual, Synthetic and Entertainment Audio, Paris, France, 9 pages.

Vannanen, Riitta, "User Interaction and Authoring of 3D Sound Scenes in the Carrouso EU project", Audio Engineering Society Convention Paper 5764, Amsterdam, The Netherlands, 2003, 9 pages.

Taiwan Patent Office, Office Action in Taiwanese patent application 096102410, dated Jul. 2, 2009, 5 pages.

Russian Notice of Allowance for Application No. 2008114388, dated Aug. 24, 2009, 13 pages.

Taiwan Examiner, Taiwanese Office Action for Application No. 96104544, dated Oct. 9, 2009, 13 pages.

* cited by examiner

APPARATUS FOR PROCESSING MEDIA SIGNAL AND METHOD THEREOF

TECHNICAL FIELD

The present invention relates to a media signal processing, and more particularly, to a method of processing a media signal and apparatus therefor.

BACKGROUND ART

Generally, in case of a media signal, an encoder compresses a multi-channel signal into a mono- or stereo-type downmix signal instead of compressing each multi-channel signal. The encoder then transfers the compressed downmix signal and spatial information or extension data to a decoder or stores them in a storage medium. And, the decoder reconstructs original multi-channels using the compressed downmix signal and the spatial information.

The number of channels, which can be basically compressed and reconstructed by encoder and decoder, is preset. In N-M-N channel configuration, on the assumption that a front 'N' is the number of channels to be transferred by an encoder, that 'M' is the number of compressed downmix signals, and that a rear 'N' is the number of channels to be reconstructed by a decoder, the encoder and decoder basically provide 5-1-5 channel configuration, 5-2-5 channel configuration, 7-2-7 channel configuration, 7-5-7 channel configuration, etc.

In case of the number of channels less than a channel configuration supported by an encoder, the channels are mapped to a channel structure supported by the encoder and then encoded. In particular, in case that channels less than the channels supported by an encoder are inputted to the encoder, encoding is carried out on the assumption that channels amounting to a difference between the number of channels compressible by the encoder and the number of channels inputted to the encoder have a virtual value. In this case, the encoder generates spatial information required for a decoder to reconstruct the channels having the virtual value and then transfers the generated spatial information to the decoder.

DISCLOSURE OF THE INVENTION

Technical Objects

An object of the present invention is to provide a media signal processing method and apparatus, by which partial spatial information required for reconstructing channels is not transferred in case that an encoder attempts to transfer channels less than basically compressible channels.

Another object of the present invention is to provide a media signal processing method and apparatus, by which decoding for generation of a channel set to a virtual value can be omitted.

Technical Solution

In the present invention, in case that an encoding apparatus attempts to transfer channels less than basically compressible channels, a channel value resulting from excluding the number of channels to be transferred from the number of the basically compressible channels is set to a virtual value. And, spatial information required for reconstructing the channels amounting to the virtual value is not transferred.

In the present invention, a decoding apparatus detects which channel is set to a virtual value among channels to be generated from a transferred media signal and omits decoding for generation of the channel set to the virtual value.

Advantageous Effects

As mentioned in the foregoing description, according to the present invention, when an encoding apparatus transfers channels less than basically compressible channels, spatial information for a channel having a valid value is generated and transferred. Hence, it is able to prevent unnecessary bit transmission.

According to the present invention, a decoding apparatus detects which channel is valid among channels to be generated from a transferred media signal and then performs decoding for valid channel generation only. Hence, it is able to reduce a decoding operation quantity for invalid channel generation.

BEST MODE FOR CARRYING OUT THE INVENTION

To achieve these and other advantages and in accordance with the purpose of the present invention, as embodied and broadly described, an audio signal decoding method according to the present invention includes detecting a channel having a valid value of the multi-channels to be generated and generating the detected channel having the valid value from the downmix signal and the spatial information signal.

To further achieve these and other advantages and in accordance with the purpose of the present invention, an audio signal decoding method includes obtaining a downmix signal which downmixed a first multi-channel audio signal and spatial information from a received bitstream, generating modified spatial information from the spatial information, and generating second multi-channel using the modified spatial information.

To further achieve these and other advantages and in accordance with the purpose of the present invention, an audio signal encoding method includes receiving channels of which number is smaller than the N, setting a channel value amounting to a difference between the N and the received channel number to a virtual value, and downmixing N channels including the channels having the virtual value.

To further achieve these and other advantages and in accordance with the purpose of the present invention, an audio signal decoding apparatus includes an extracting unit extracting a downmix signal and a spatial information signal and a channel generating unit detecting a channel having a valid value among multi-channels to be generated from the spatial information signal, the channel generating unit generating the detected channel having the valid value using the downmix signal and the spatial information signal.

To further achieve these and other advantages and in accordance with the purpose of the present invention, an audio signal encoding apparatus includes a channel value setting unit receiving channels of which number is smaller than the N, the channel setting unit setting a channel value amounting to a difference between the N and the received channel number to a virtual value, a spatial information extracting unit generating a spatial information signal including valid channel indicating information indicating which one of the N channels corresponds to the received channel, and a downmixing unit downmixing N channels including the channels having the virtual value.

MODE FOR INVENTION

Reference will now be made in detail to the preferred embodiments of the present invention, examples of which are illustrated in the accompanying drawings. The present invention relates to a media signal decoding method and apparatus. In this case, a media signal includes an audio signal or a video signal.

Figure 1:
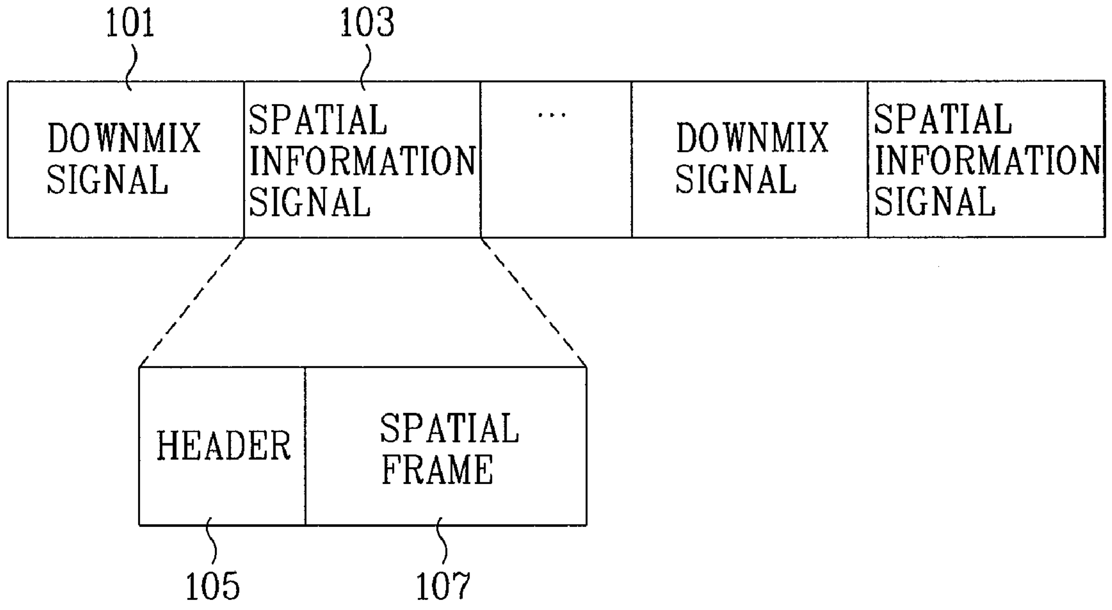
FIG. 1 is a configurational diagram of a media signal transferred to a decoding apparatus by an encoding apparatus according to an embodiment of the present invention.

FIG. 1 is a configurational diagram of a media signal transferred to a decoding apparatus by an encoding apparatus according to an embodiment of the present invention.

Referring to FIG. 1, a media signal includes a downmix signal 101 and a spatial information signal 103. The downmix signal 101 is a signal generated from downmixing a multichannel media signal. The downmix signal 101 can be generated via a downmixing unit (not shown in the drawing) included in an encoding apparatus or in an artificial manner. The media signal exists in an ES (elementary stream) form having frames arranged therein. The downmix signal 101 and the spatial information signal 103 can be transferred to a decoding apparatus in separate ES forms, respectively. Alternatively, the downmix signal 101 and the spatial information signal 103, as shown in FIG. 1, can be transferred to the decoding apparatus by being combined into one ES form.

The spatial information signal 103 is extracted when a multi-channel media signal is downmixed. The spatial information signal 103 is used by a decoding apparatus in reconstructing an original multi-channel media signal from the downmix signal 101 that is compressed.

The encoding apparatus is able to generate the spatial information signal 103 by downmixing all multi-channel media signals inputted thereto. Yet, in case that channels, of which number is smaller than that of channels supported by the encoding apparatus, are inputted to the encoding apparatus, it is assumed that channels corresponding to the number resulting from excluding the number of the inputted channels from the number of the channels supported by the encoding apparatus, have a virtual value. So, the spatial information signal 103 for the channel having the virtual value is not generated. Even if the spatial information signal 103 for the channel having the virtual value is generated, it may not be transferred to the decoding apparatus. Besides, the encoding apparatus is able to represent the spatial information for the channel having the virtual value in a simple manner using a default value or an extreme value.

A spatial parameter, valid channel indicating information, tree structure information, and the like can be included in the spatial information signal 103. The spatial parameter is the information indicating a relation between multi-channel signals. The spatial parameter includes CLD (channel level differences) indicating an energy difference between media signals, ICC (interchannel correlations) ICC indicating correlations or similarity between media signals, CPC (channel prediction coefficients) indicating a coefficient for predicting a media signal value using different signals, or the like.

The spatial information signal 103 includes information indicating whether a channel inputted to an encoding apparatus is the channel having a valid value or the channel having a virtual value generated to support a basic configuration of an encoding apparatus in case of inputting channels, of which number is smaller than that for a channel configuration of the encoding apparatus. Hereinafter, information indicating whether a channel inputted to an encoding apparatus has not a virtual value but a valid value is named valid channel indicating information. The valid channel indicating information can be included in a header 105 or spatial frame 107 of the spatial information signal 103. The spatial information is the information extracted in the course of downmixing a channel signal according to a determined tree structure. In this case, the determined tree structure means the tree structure agreed between a decoding apparatus and an encoding apparatus. The spatial information signal 103 can include tree structure information. The tree structure information is the information for a type of the tree structure. According to the type of the tree structure, the number of multi-channels, a per channel downmix sequence, and the like can be changed.

The encoding apparatus generates a bitstream type media signal by multiplexing the encoded downmix signal 101 and the spatial information signal 103 together and then transfers the generated signal to the decoding apparatus.

Figure 2:
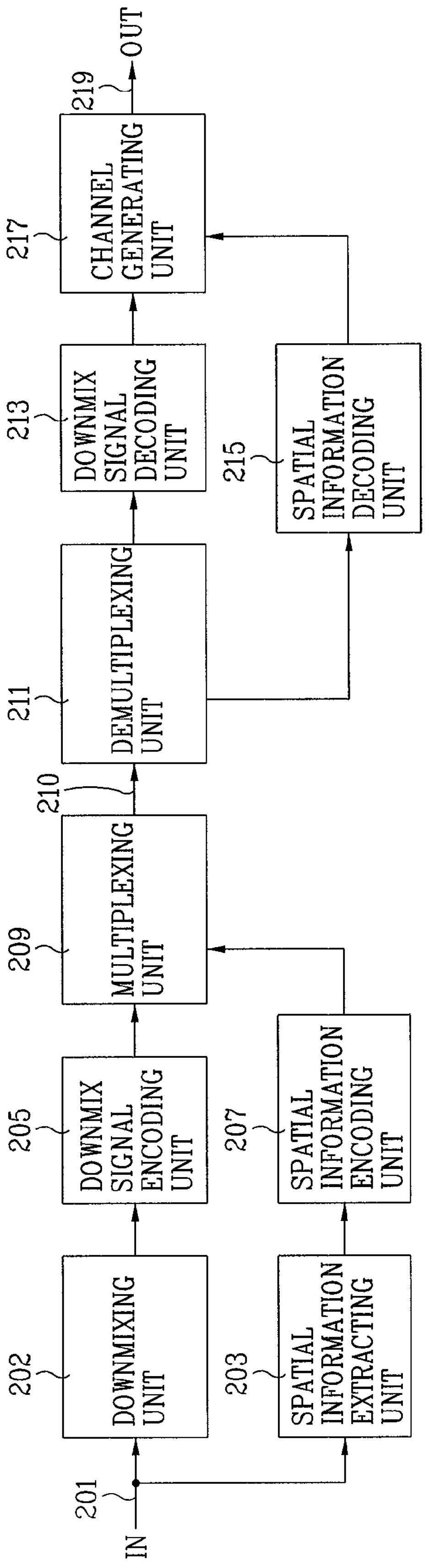
FIG. 2 is a block diagram of a media device including encoding and decoding apparatuses according to an embodiment of the present invention.

FIG. 2 is a block diagram of a media device including encoding and decoding apparatuses according to an embodiment of the present invention.

Referring to FIG. 2, a media device includes an encoding apparatus and a decoding apparatus. The encoding apparatus includes a downmixing unit 202, a spatial information extracting unit 203, a downmix signal encoding unit 205, a spatial information encoding unit 207, and a multiplexing unit 209. And, the decoding apparatus includes a demultiplexing unit 211, a downmix signal decoding unit 213, a spatial information decoding unit 215, and a channel generating unit 217.

The downmixing unit 202 of the encoding apparatus generates one of two downmix signals by downmixing a multichannel media signal 201 and then sends the generated signal(s) to the downmix signal encoding unit 205. The downmix signal encoding unit 205 generates an encoded downmix signal by encoding the downmix signal and then sends the encoded downmix signal to the multiplexing unit 209.

The spatial information extracting unit 203 generates a spatial information signal 103 by extracting a spatial parameter from the multi-channel media signal 201.

The encoding apparatus can include a channel value setting unit (not shown in the drawing) provided in front of the downmixing unit 202. The channel value setting unit sets a virtual value to a channel value amounting to the number resulting from excluding the number of inputted channels from the number of channels supported by the encoding apparatus. Since the decoding apparatus needs not to reconstruct the channel for which the virtual value is set, it is unnecessary for the encoding apparatus to generate spatial information for the virtual value set channel. Alternatively, the decoding apparatus can represent the spatial information for the virtual value set channel as a default value, an extreme value, or the like in a simple manner.

The spatial information extracting unit generates a spatial information signal 103 for a channel having a valid value and then sends the signal to the spatial information encoding unit 207. In this case, the spatial information signal 103, as mentioned in the foregoing description, can includes an indicator, a spatial parameter, a channel configuration identifier, a modified spatial information signal type, and the like.

The spatial information encoding unit 207 generates an encoded spatial information signal 103 by encoding the spatial information signal 103 and then sends the generated signal to the multiplexing unit 209.

And, the multiplexing unit 209 generates a bitstream type media signal 210 by multiplexing the encoded downmix signal received from the downmix signal encoding unit 205 and the encoded spatial information signal 103 received from the spatial information encoding unit 207 together and then transfers the generated signal to the decoding apparatus.

Meanwhile, the decoding apparatus receives the bitstream type media signal 210 transferred by the encoding apparatus or extracts the previously stored media signal 210.

The demultiplexing unit 211 included in the decoding apparatus parses the bitstream type media signal 210 into an encoded downmix signal and an encoded spatial information signal, sends the encoded downmix signal to the downmix signal decoding unit 213, and sends the encoded spatial information signal to the spatial information decoding unit 215.

The downmix signal decoding unit 213 generates a decoded downmix signal and then sends the generated decoded downmix signal to the channel generating unit 217. And, the spatial information decoding unit 215 decodes the spatial information signal and then sends the decoded spatial information signal to the channel generating unit 217.

The decoding unit is able to include a modified spatial information signal generating unit (not shown in the drawing). The modified spatial information signal generating unit modifies a modified spatial information signal by modifying the spatial information signal 103. The modified spatial information signal means a spatial information signal newly generated by modifying a spatial information signal. The modified spatial information signal can be generated by including a spatial information signal in part or combining spatial information signals. The modified spatial information signal generating unit is able to generate a modified spatial information signal using tree structure information, output channel information, and the like. The output channel information is the information for a speaker interconnected to the decoding apparatus and can include the number output channels, position information for each output channel, etc. The output channel information can be inputted to the decoding apparatus in advance by a manufacturer or can be inputted to the decoding apparatus by a user.

The decoding apparatus recognizes the number of original multi-channels downmixed by the encoding apparatus using the tree structure information and also recognizes the number of channels to be generated. The decoding apparatus decides whether the number of the downmixed original channels is equal to the number of the channels to be generated. Hereinafter, original channels downmixed by an encoding apparatus are named first multi-channels and channels to be generated by a decoding apparatus are named second multi-channels. If the number of the first multi-channels downmixed by the encoding apparatus is different from the number of the second multi-channels to be generated or if the first multi-channels differ from the second multi-channels in the number of channels having valid values despite that the channels numbers are equal to each other, the decoding apparatus is able to modify a spatial information signal using the modified spatial information signal generating unit. The modified spatial information signal can be generated using a correlation with the valid values of the second multi-channels.

The decoding apparatus is able to generate the modified spatial information signal by combining the aforesaid spatial parameters CLD, ICC, CPC, IPD, and the like. In particular, if the number of the first multi-channels is smaller than that of the second multi-channels, the decoding apparatus can generates channels of which number is smaller than that of the first multi-channels by combining the transferred spatial parameters. For instance, a downmix signal generated being downmixed from 5.1 channels by an encoding apparatus can be upmixed into a 2-channel signal by a decoding apparatus. The decoding apparatus is able to generate a modified spatial parameter using the transferred spatial parameters in part. For instance, a downmix signal generated from being downmixed from 5.1 channels is upmixed using the transferred parameters in part to be generated into channels of which number is smaller than that of the 5.1 channels. Thus, the decoding apparatus is able to generate the second multi-channels of which number is different from that of the first multi-channels using the modified spatial information signal and the downmix signal.

The channel generating unit 217 reconstructs a multi-channel media signal 219 using the decoded downmix signal and the decoded spatial information signal. The decoding apparatus is able to decide which one of the multi-channel signal 219 to be generated from the transferred media signal 210 is a valid channel and which channel has a virtual value. A method of deciding a valid channel by the decoding apparatus using the spatial information signal 103 will be explained in detail with reference to FIGS. 3 to 5 later. The decoding apparatus detects a valid channel from the multi-channel signal 219 to be generated suing the spatial information signal 103 and is then able to perform decoding to generate a channel having the valid value only. Namely, the decoding apparatus is able to avoid performing the decoding for generating a channel having an invalid value.

In the following description for a method of compressing, transferring and reconstructing channels of which number is smaller than that of the channels supported by an encoding apparatus and a decoding apparatus, an encoding pre-processing and an encoding are explained with reference to FIG. 3 and a decoding is then explained with reference to FIG. 4 and FIG. 5.

1. Encoding Pre-Processing

If a number of channels basically compressible and reconstructible by an encoding apparatus and a decoding apparatus is 'N', an inputted multi-channel media signal 210 can include channels of which number is greater or smaller than 'N'. If the channel number of the media signal 201 is smaller than N, a channel value corresponding to a difference between the N and the channel number of the inputted media signal 201 should be set to a virtual value. Encoding and decoding can be performed only if an N-channel configuration including valid channels and the channels having the virtual value is established. In this case, the channel value corresponding to the difference between the N and the channel number of the inputted media signal 201 can be set to 0.

An encoding preprocessing is explained with reference to as follows. FIG. 3 is a block diagram of a downmixing unit 202 according to an embodiment of the present invention.

Figure 3:
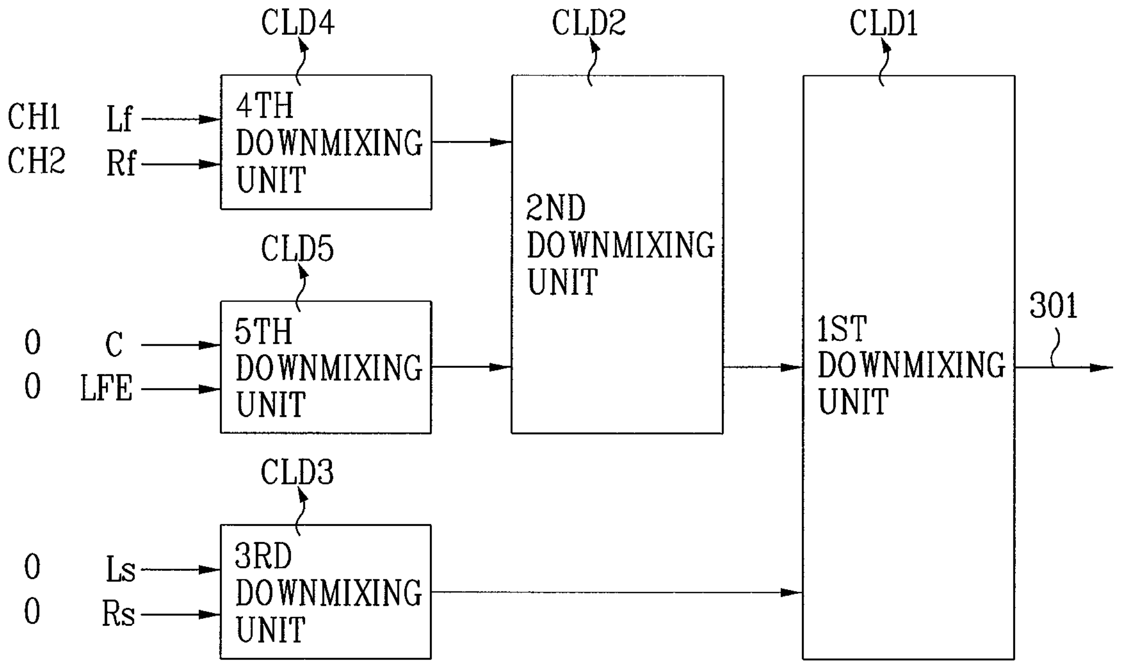
FIG. 3 is a block diagram of a downmixing unit according to an embodiment of the present invention.

Referring to FIG. 3, a downmixing unit 202 of an encoding apparatus includes first to fifth downmixing units. In this drawing, the encoding apparatus has a 5.1 channel structure. And, 5.1 channels include a center front channel C, a left front channel LF, a right front channel RF, a left surround channel LS, a right surround channel RS, and a woofer channel LFE (low frequency enhancement). In case that the encoding apparatus has the 5.1 channel structure, a media signal having channels less than 5.1 channels should be mapped to the 5.1 channel structure prior to being encoded. The media signal can be then encoded using such a tree structure as 5-15, 5-2-5, and the like. Since a media signal 301 applied to the encoding apparatus in FIG. 3 has two channels LF and RF, it should be assumed that the rest of the non-applied channels, i.e., the channels C, LFE, LS, and RS have the virtual value, i.e., 0. The encoding apparatus performs encoding on total six channels including the channels having the virtual value.

2. Encoding

The downmixing unit 202 generates a downmix signal from inputted multi-channels. The downmixing unit 202 uses an OTT one-to-two) or TTT (two-to-three) box to render two channels into one channel or render three channel to two channels. The OTT or TTT box is a conceptional box used for a decoding apparatus to reconstruct original multi-channels using a downmix signal and spatial information. In particular, a media signal received from the media signal encoding apparatus is parsed into an encoded downmix signal 101 and an encoded spatial information signal 103 by the demultiplexing unit 211, decoded, and then sent to the channel generating unit 217. The channel generating unit 217 outputs two signals from one input signal or three signals from two input signals using the OTT or TTT box in reconstructing original multi-channels using the decoded downmix signal 101 and the decoded spatial information signal 103. To correspond to a fact that the OTT or TTT box is used by the channel generating unit 217 of the media signal decoding apparatus, the downmixing unit 202 of the media signal encoding apparatus uses the OTT or TTT box to downmix inputted multi-channels into one or two signals. Hereinafter, the OTT or TTT box used by the media signal encoding apparatus is called a ordinal-number downmixing unit or the OTT or TTT box used by the media signal decoding apparatus is called a ordinal-number upmixing unit. The spatial information extracting unit 203 extracts a spatial parameter indicating a relation between input channels when the input channels pass through the downmixing unit 202. For convenience of explanation, in FIG. 3, CLD is exemplarily shown as the spatial parameter extracted by the downmixing unit, which does not put limitation of the extracted spatial parameter.

A method of transferring a spatial parameter value for a valid channel or an invalid channel by an encoding apparatus is explained as follows.

2.1 Method of Generating Spatial Information Signal 2.11 Method of Setting Spatial Parameter Value to Maximum or Minimum Value In FIG. 3, total six channels including the channel having the virtual value by the encoding preprocessing are inputted to the encoding apparatus. The inputted channels are applied to third to fifth downmixing units. Signals from the fourth and fifth downmixing units enter the second downmixing unit, and signals from the second and third downmixing units enter the first downmixing unit. Since the channels inputted to the third and fifth downmixing units are virtual channels having vales 0, the third and fifth downmixing units need not to extract the spatial parameter indicating the relation between the virtual channels. The fourth downmixing unit extracts a spatial parameter CLD4 indicating a relation between two channels from two channels LF and RF. The second downmixing unit extracts a spatial parameter CLD2 indicating a relation between signals coming from the fourth and the fifth downmixing units. The first downmixing unit extracts a spatial parameter CLD1 indicating a relation between signals coming from the second and the third downmixing units. The spatial parameter CLD1 extracted by the first downmixing unit or the spatial parameter CLD2 extracted by the second downmixing unit can be a maximum or minimum value within a range of CLD values. In particular, the spatial parameter CLD2 extracted by the second downmixing unit means an energy difference between the signal outputted from the fourth downmixing unit and the signal outputted from the fifth downmixing unit. The signal downmixed by the fourth downmixing unit has a valid value, whereas the signal downmixed by the fifth downmixing unit has a value 0. So, the energy (or level) leans on the signal outputted from the fourth downmixing unit only. Assuming that the CLD value ranges between a maximum 150 and a minimum (−)150, the CLD2 value becomes the maximum 150 with reference to the signal downmixed by the fourth downmixing unit. Likewise, the CLD1 becomes 150 with reference to the signal downmixed by the second downmixing unit. The spatial information extracting unit 203 extracts a spatial parameter while the downmixing unit 202 downmixes multi-channels and then generates the spatial information signal 103 using the extracted spatial parameter. The encoding apparatus is able to transfer all the values of the extracted spatial parameters CLD1 to CLD5 to the decoding apparatus in a manner that the values of the extracted spatial parameters CLD1 to CLD5 are included in the spatial information signal 103. In this case, since the energy faces one of the two signals only, the decoding apparatus is able to detect what channel has a valid value in the multi-channel signal 219 to be generated using a fact that CLD1 or CLD2 is 150.

The encoding apparatus transfers the spatial information signal 103 to the decoding apparatus in a manner that information indicating whether the spatial parameter value extracted by each of the downmixing units is equal to a previous parameter value, whether it is an interpolated value, a preset default value, or a value to be newly read is included in the spatial information signal 103. In this case, as mentioned in the foregoing description, the encoding apparatus enables the information, which indicates the spatial parameter value is represented as the value to be newly read, to be included in the spatial information signal 103 and is then able to transfer all the spatial parameter values to the decoding apparatus. In this case, an unnecessary spatial parameter for invalid channel generation may be sent to waste bits. So, the encoding apparatus can use the following method to minimize the bit size of the spatial signal information 103.

2.1.2 Method of Setting Spatial Parameter Value to Default

The encoding apparatus is able to omit an unnecessary spatial parameter transmission in a manner of transmitting information indicating that a spatial parameter value is a preset default value. In this case, the encoding apparatus is able to omit an unnecessary spatial parameter value transmission in a manner of transferring a spatial parameter value, which is extracted in downmixing a channel having a virtual value, to the decoding apparatus by representing the extracted spatial parameter value as a default value. For instance, in case that the encoding apparatus and the decoding apparatus set a case that a CLD value is a maximum 150 to a default value 1 and a case that the CLD value is 0 to a default value 0, the encoding apparatus is able to reduce a bit size of the spatial information signal 103 in a manner of transmitting bits, which indicate that the values of the CLD1 and CLD2 are the default value and that the value is 1, instead of transmitting the value 150 of the CLD1 and CLD2 in FIG. 3 as bits.

2.1.3 Method of Transmitting Valid Channel Indicating Information

The encoding apparatus is able to reduce a spatial information signal bit size by transmitting a spatial parameter for a valid channel only. In FIG. 3, the encoding apparatus is able to transfer the spatial information signal 103 including the spatial parameter CLD4 generated from the channels LF and RF having the valid value only instead of having CLD3 or CLD5 included in the spatial information signal 103. In this case, the decoding apparatus decides that the value of the spatial parameter is meaningless since the spatial parameter applied to the third upmixing unit (not shown in the drawing) and the fifth upmixing unit (not shown in the drawing) in the spatial information signal 103 transferred from the encoding apparatus. The decoding apparatus is then able to decide that the channel value outputted from the third upmixing unit and the fifth upmixing unit is 0. Thus, in case that the encoding apparatus transfers the spatial information signal 103 having the partial spatial parameter included therein only, in order to enable the decoding apparatus to decided which channel is valid, the encoding apparatus generates valid channel indicating information and is then able to transfer the generated information to the decoding apparatus by having the information included in the spatial information signal 103.

The valid channel indicating information is the information indicating whether the channel inputted to the encoding apparatus is the channel having the valid value instead of having the virtual value. As a method of generating the valid channel indicating information, a method of representing whether a channel is a valid channel according to each channel sequence or a method of representing whether each upmixing unit generates a valid channel to correspond to each downmixing unit can be considered. To prepare for a case that channels less than compressible and re-constructible channels are applied, the encoding apparatus and the decoding apparatus can consider a method that the encoding apparatus and the decoding apparatus mutually promise a channel configuration for input channels less than the channels supported by the encoding apparatus and that the encoding apparatus informs the decoding apparatus of the channel configuration of the applied channels.

A method of representing whether each channel is a valid channel according to a channel sequence is explained with reference to FIG. 3 as follows. Inputted channels in 5-1-$5_1$ channel configuration are a channel LF, a channel RF, a channel C, a channel LFE, a channel LS, and a channel RS from an upper side. Since the channel LF or RF is a valid channel, it is represented as 1. Since the rest of the channels are virtual channels, they are represented as 0. So, it is able to generate 6-bit valid channel indicating information like 110000 from an upper side in a channel sequence. In a method of representing whether each downmixing or upmixing unit is valid, the encoding apparatus is able to represent a case of using the downmixing unit as 1 or a case of not using the downmixing unit as 0 in order of first to fifth downmixing units. In FIG. 3, since the fourth downmixing unit is used only to downmix tow channels LF and RF, it is able to generate valid channel indicating information by representing a presence or non-presence of using each downmixing unit by 5 bits. The encoding apparatus is able to transfer a channel configuration identifier as valid channel indicating information. A method of promising a channel configuration according to a channel combination between encoding and decoding apparatuses in advance is explained with reference to Table 1 as follows.

TABLE 1

| Channel configuration identifier | Input & output channel configuration |
|---|---|
| 0 (000) | MONO |
| 1 (001) | 2 (LF, RF) |
| 2 (010) | 3 (LF, RF, C) |
| 3 (011) | 3.1 (LF, RF, C, LFE) |
| 4 (100) | 4 (LF, RF, LS, RS) |
| 5 (101) | 4.1 (LF, RF, LS, RS) |
| 6 (110) | 5 (LF, RF, C, LS, RS) |
| 7 (111) | 5.1 |

For example, in case of the 5.1 channel structure, a channel combination below 5.1 channels has the channel configuration shown in Table 1. The encoding apparatus and the decoding apparatus mutually promise the channel configuration like Table 1, generates channel configuration identifiers according to the number of input channels, and then transfers the identifiers to the decoding apparatus. Referring to FIG. 3, since the number of the input channels applied to the encoding apparatus is 2, the encoding apparatus can inform the decoding apparatus that valid channels are channels LF and RF by transferring a channel configuration identifier 1 (001) to the decoding apparatus. The encoding apparatus is able to transfer the valid channel indicating information to the decoding apparatus by having the valid channel indicating information included in the header 105 or spatial frame 107 of the spatial information signal 103. As mentioned in the foregoing description, the encoding apparatus generates the spatial information signal 103 efficiently and the transfers the signal to the decoding apparatus together with or separately from the downmix signal 101.

3. Decoding 3.1 Method of Deciding Presence or Non-Presence of Valid Channel

The decoding apparatus reconstructs the original multichannel media signal 219 inputted to the encoding apparatus using the downmix signal 101 and the spatial information signal 103 transferred from the encoding apparatus or the previously stored downmix and spatial information signals 101 and 103. The decoding apparatus extracts a spatial parameter from the spatial information signal 103 and then applies the extracted spatial parameter to each upmixing unit to reconstruct the original channel. The decoding apparatus extracts information indicating a type of a modified spatial information signal from the spatial information signal 103 and then generates the identified type modified spatial information signal from the spatial information signal 103. The type of the modified spatial information includes a partial spatial information signal or an extended spatial information signal. The partial spatial information signal includes a portion of the spatial parameter, and the extended spatial information is generated using an extended spatial information signal and a spatial information signal. If a signal for identifying a type of the modified spatial information signal is included in the spatial information signal 103, the decoding apparatus generates the modified spatial information signal by modifying the spatial information signal 103 using the signal included in the spatial information signal 103 and then decodes a downmix signal using the modified spatial information signal. If the type of the modified spatial information signal is the partial spatial information signal, the decoding apparatus detects that channels less than the channels supported by the decoding apparatus are reconstructed. Namely, the decoding apparatus detects that a channel having an invalid value can be reconstructed. The decoding apparatus is able to decide which channel has a valid value among channels to be reconstructed using the spatial information signal 103 transferred by the encoding apparatus. The decoding apparatus extracts a spatial parameter value to be applied to each upmixing unit from the spatial information signal 103 and then decides whether the channel to be reconstructed is a valid channel using the extracted spatial parameter value. Alternatively, the decoding apparatus is able to decide whether a channel to be reconstructed is a valid channel using the valid channel indicating information or the channel configuration identifier extracted from the spatial information signal 103.

A method that decoding apparatus having a 5-1-$5_1$ channel configuration reconstructs a valid channel is explained with reference to FIG. 4. And, a method that a decoding apparatus having a 5-1-$5_2$ channel configuration reconstructs a valid channel is explained with reference to FIG. 5.

Figure 4:
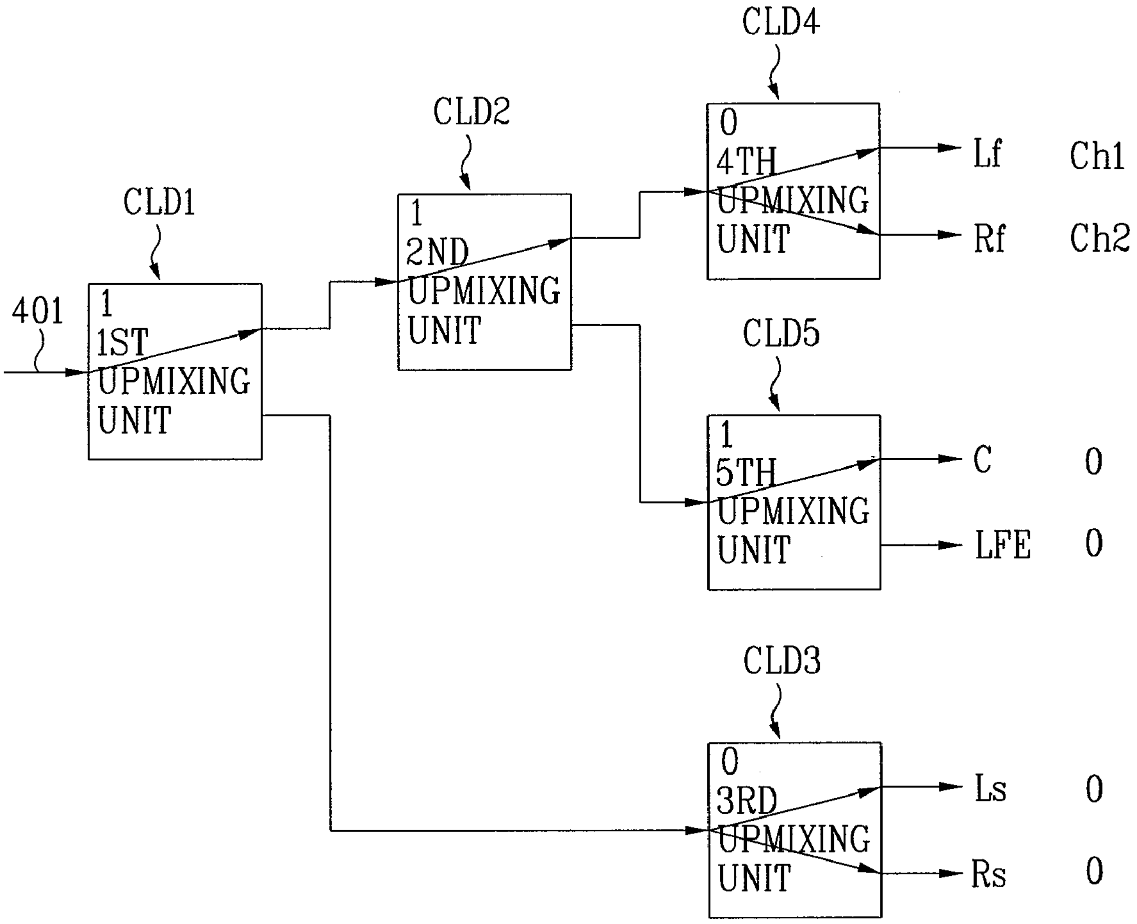
FIG. 4 is a block diagram of a channel generating unit.

FIG. 4 is a block diagram of the channel generating unit 217 of the decoding apparatus reconstructing channels LF and RF by receiving a media signal from an encoding apparatus having the downmixing unit 202.

Referring to FIG. 4, the decoding apparatus extracts a spatial parameter value from the spatial information signal 103 and then reconstructs an original signal by applying the extracted spatial parameter value to first to fifth upmixing units.

The decoding apparatus reads information for the upmixing unit for each spatial frame 107. The information for the upmixing unit includes information for a spatial parameter value applied to each upmixing unit. The spatial parameter value can be a default value, a value equal to a previous parameter value, an interpolated value, or an encoded value newly extracted from a spatial information signal 103. If the spatial parameter value is the encoded value extracted from the spatial information signal 103, the decoding apparatus extracts a spatial parameter value, decodes the extracted value, and then applies the decoded value to each upmixing unit.

In case that the encoding apparatus in FIG. 3 transfers the values of the spatial parameters CLD1 to CLD5 extracted in downmixing to the decoding apparatus by having the values included in the spatial information signal 103, the decoding apparatus is able to detect that the first and second upmixing units make all energy proceed in a direction of an arrow shown in the drawing using a fact that the CLD1 applied to the first upmixing unit and the CLD2 applied to the second upmixing unit are 150.

The decoding apparatus is able to reconstruct the channels LF and RF by extracting the spatial parameter CLD4 from the spatial information signal 103 and then applying the extracted CLD4 to the fourth upmixing unit.

The decoding apparatus is able to decide that the channels outputted from the value of the channels C, LFE, LS, and RS outputted from the third to fifth upmixing units is 0 using a fact that the energy does not proceed to the third upmixing unit and the fifth upmixing unit. Namely, the decoding apparatus is able to decide that a channel outputted from a lower upmixing unit is 0 using a spatial parameter value applied to an upper upmixing unit. So, it may happen that a spatial parameter value applied to a lower upmixing unit is not necessary according to a spatial parameter value applied to an upper upmixing unit.

If an encoding apparatus represents a spatial parameter value as a default value and transfers it to a decoding apparatus, the decoding apparatus applies the spatial parameter value according to the default value to each upmixing unit without reading a spatial parameter value newly. In FIG. 3, since CLD1 and CLD2 are 150, the encoding apparatus represents it as a default value 1 and then transfers it to the decoding apparatus. In FIG. 4, a decoding apparatus is able to detect that CLD1 and CLD2 are 150 using a default value 1. The decoding apparatus detects that all energy faces an upper direction by applying the CLD1 and CLD2 values to the first and second upmixing units, respectively and is then able to decide a specific channel having a valid value and a specific channel having a virtual value.

The decoding apparatus is able to decide a specific valid channel from valid channel indicating information or channel configuration identifier included in the spatial information signal 103.

The decoding apparatus is able to use the valid channel indicating information indicating whether a channel is a valid channel in each channel sequence or a method of displaying whether each upmixing unit generates a valid channel. In FIG. 4, the decoding apparatus is able to detect that the channels LF and RF are valid channels only and that the rest four channels have a value 0, using a fact that information indicating a specific channel in each channel sequence is 110000. And, the decoding apparatus is able decide that valid channels are the channels LF and RF by deciding that the fourth upmixing unit is activated to generate a valid channel only and that the rest of the upmixing units do not generate valid channels, using the valid channel indicating information 00010 indicating whether signals are generated in order of the upmixing units. And, the decoding apparatus is able to decide that the channels LF and RF are valid channels using a fact that the channel configuration identifier is 1 (001).

Figure 5:
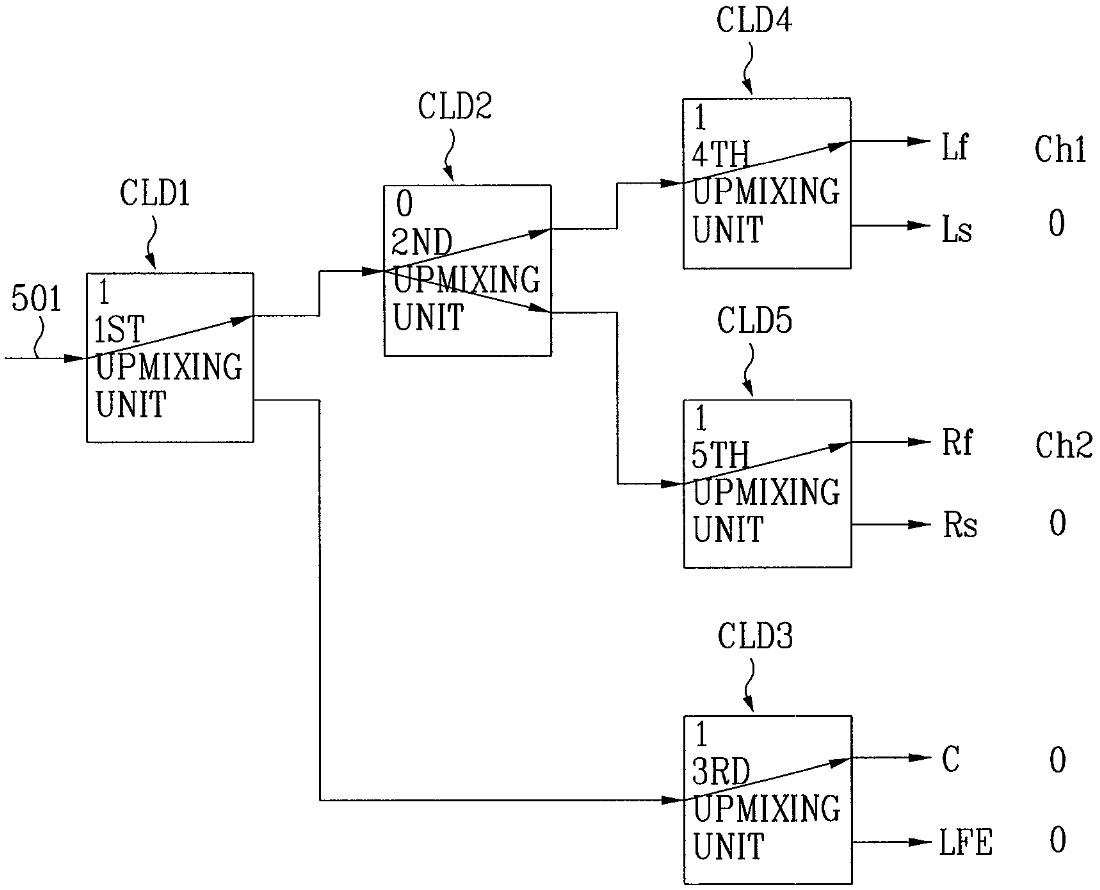
FIG. 5 is a diagram of a method of deciding a valid channel in a decoding apparatus.

FIG. 5 is a diagram of a method of deciding a valid channel in a decoding apparatus having a 5-1-$5_2$ channel configuration.

Referring to FIG. 5, a decoding apparatus extracts a spatial parameter value from a spatial information signal 103 and applies the value to each upmixing unit. If the extracted value is a default value, the decoding apparatus uses a spatial parameter value corresponding to the default value and then applies the used value to each upmixing unit.

The decoding apparatus is able to detect that a signal outputted from the first upmixing unit faces an upper direction only using a fact that the extracted CLD1 is 150 or that a default value for the extracted CLD1 is 1. The decoding apparatus is able to detect that a signal is outputted from the second upmixing unit by being divided into two signals using a fact that the CLD2 is 0 or that the default value is 0. And, the decoding unit is able to detect that a signal outputted from the fourth upmixing unit and a signal outputted from the fifth upmixing unit face the upper direction only using a fact that CLD4 and CLD5 is 150 or that the default value is 1. Hence, the decoding apparatus is able to decide that channels LF and RF are valid channels. As mentioned in the foregoing description, the decoding apparatus is able to a specific valid channel using the valid channel indicating information included in the spatial information signal 103. In FIG. 5, if the valid channel indicating information represented according to each output channel sequence is 101000, the decoding apparatus is able to decide that a first output channel LF and a third output channel RF are valid channels. If the valid channel indicating information represented according to each output channel sequence is 01000, the decoding apparatus is able to decide that the channels LF and RF are valid channels by detecting that the second upmixing unit generates a valid channel. In case that the channel configuration identifier is 1 (001), the decoding apparatus is also able to decide that the channels LF and RF are valid channels among output channels using the channel configuration identifier.

3.2 Method of Omitting Decoding for Non-Valid Channel

The decoding apparatus is able to carry out decoding according an original channel configuration if a signal having channels of which number is smaller than that of channels of the original channel configuration is received. In this case, the decoding apparatus however reconstructs a virtual channel having an invalid value. So, the decoding apparatus is able to omit a series of decoding processes for generating a channel decided as invalid, i.e., a process for generating a non-correlation signal using a decorrelator, a process for synthesis filterbank, a process for matrix operation, a process for coefficient generation, and the like.

3.3 Valid Channel Display

The decoding apparatus is able to display on a user or post-processing device whether a channel included in the multi-channel signal 219 is a valid channel or a channel having a virtual value. The decoding apparatus is able to decide which one is a valid channel using the aforesaid method prior to reconstructing the multi-channel media signal 219. This does not put limitation on the present invention. Optionally, the decoding apparatus reconstructs the multi-channel media signal 219 by decoding the media signal 210, decides which one of the reconstructed channels is a valid channel, and then displays the decision externally. The post-processing device is able to perform downmixing according to a user's selection or a post-processing such as a sound field representation and the like using the valid channel indicated by the decoding apparatus in the multi-channel media signal outputted from the decoding apparatus.

What is claimed is:

1. A method of decoding an audio signal, comprising:

receiving a downmix signal and spatial information including a virtual channel;

detecting the virtual channel by using the spatial information; and generating a multi-channel audio signal by upmixing the downmix signal based on the spatial information, wherein an energy level of the virtual channel is 0.

2. The method of claim 1, wherein the spatial information related to the virtual channel has maximum value or minimum value in the range of spatial information.

3. The method of claim 2, wherein the spatial information related to the virtual channel has default value.

4. The method of claim 1, wherein the virtual channel is determined by using valid channel indicating information included in the spatial information.

5. The method of claim 4, wherein the valid channel indicating information includes an identifier indicating whether a channel to be generated has valid value, information indicating whether an upmixing unit is used for generating the multi-channel audio signal from the downmix signal by converting one signal into two signals or two signals into three signals, or information indicating configuration information of the channel having the valid value.

6. An apparatus of decoding an audio signal, comprising:

a demultiplexing unit separating a downmix signal generated from a multi-channel audio signal and spatial information related to a virtual channel among the multi-channel audio signal;

a downmix signal decoding unit decoding the downmix signal including the virtual channel; and a channel generating unit generating the multi-channel audio signal using the downmix signal including the virtual channel and the spatial information, wherein the channel generating unit detects the virtual channel using the spatial information and the energy level of the virtual channel is 0.

7. The apparatus of claim 6, wherein the channel generating unit detects the virtual channel based on the spatial information having maximum value or minimum value in the range of the spatial information.

8. An apparatus for encoding an audio signal, comprising:

a channel setting unit assigning M channels signal to N channels and setting an energy level of a virtual channel among the N channels to be 0, the channel number of the M channels signal being less than N;

a spatial information generating unit generating spatial information from an audio signal having the N channels; and a downmixing unit downmixing the audio signal having the N channels.

9. The apparatus of claim 8, wherein the spatial information generating unit generates the spatial information as maximum value or minimum value in the range of the spatial information.

10. The apparatus of claim 8, wherein the spatial information generating unit generates the spatial information related to the virtual channel as default value indicating the virtual channel.

11. A method of encoding an audio signal, comprising:

assigning M channels signal to N channels, the channel number of the M channels signal being less than N;

setting an energy level of a virtual channel among the N channels to be 0; and generating a downmix signal and spatial information from an audio signal having the N channels.

12. The method of claim 11, wherein the spatial information related to the virtual channel has maximum value or minimum value in the range of the spatial information.

13. The method of claim 11, wherein the spatial information related to the virtual channel has default value.

* * * * *